(12) United States Patent
Shabtay et al.

(10) Patent No.: US 12,112,525 B2
(45) Date of Patent: Oct. 8, 2024

(54) SYSTEM AND METHOD FOR SEGMENT-AWARE SEMANTIC SEGMENTATION

(71) Applicant: GEOX GIS INNOVATIONS LTD., Petach Tikva (IL)

(72) Inventors: Lior Shabtay, Ramat Gan (IL); Alon Wander, Kiryat Gat (IL)

(73) Assignee: GEOX GIS INNOVATIONS LTD., Petach Tikva (IL)

( * ) Notice: Subject to any disclaimer, the term of this patent is extended or adjusted under 35 U.S.C. 154(b) by 0 days.

(21) Appl. No.: 18/383,493

(22) Filed: Oct. 25, 2023

(65) Prior Publication Data

US 2024/0135690 A1    Apr. 25, 2024
US 2024/0233345 A9    Jul. 11, 2024

(30) Foreign Application Priority Data

Oct. 25, 2022 (IL) .......................... 297653

(51) Int. Cl.

| G06V 10/766 | (2022.01) |
|---|---|
| G06V 10/26 | (2022.01) |
| G06V 10/764 | (2022.01) |
| G06V 10/774 | (2022.01) |
| G06V 10/776 | (2022.01) |
| G06V 10/82 | (2022.01) |
| G06V 20/17 | (2022.01) |
| G06V 20/70 | (2022.01) |

(52) U.S. Cl.
CPC ............ *G06V 10/776* (2022.01); *G06V 10/26* (2022.01); *G06V 10/764* (2022.01); *G06V 10/774* (2022.01); *G06V 10/82* (2022.01); *G06V 20/17* (2022.01); *G06V 20/70* (2022.01)

(58) Field of Classification Search
CPC .... G06V 10/776; G06V 10/26; G06V 10/764; G06V 10/774; G06V 10/82; G06V 20/17; G06V 20/70
See application file for complete search history.

(56) References Cited

U.S. PATENT DOCUMENTS

| 11,416,772 B2 | 8/2022 | Wang et al. |
| 11,995,720 B1* | 5/2024 | Winklevoss ........... G06Q 40/04 |
| 2013/0250353 A1* | 9/2013 | Hara .................. G06K 15/1851 |
| | | 358/1.15 |
| 2013/0293745 A1* | 11/2013 | Tamura .................. H04N 23/71 |
| | | 348/234 |

(Continued)

*Primary Examiner* — Ming Y Hon
(74) *Attorney, Agent, or Firm* — AlphaPatent Associates Ltd.; Daniel J. Swirsky

(57) ABSTRACT

Updating a machine learning model for semantic segmentation by receiving an image and a segment ID mask, the image having a plurality of pixels, and the segment ID mask containing for each pixel of the image one of a plurality of segment identifiers identifying a segment to which the pixel belongs, feeding the image to a machine learning model and computing an outcome, computing a per-segment value for each one of the plurality of segment identifiers from the outcome and from pixels associated with the one of the plurality of segment identifiers, aggregating a plurality of per-segment values to create a segment-aware value and using the segment-aware value for training, validating and testing the machine learning model.

15 Claims, 14 Drawing Sheets

(56) References Cited

U.S. PATENT DOCUMENTS

| | | | |
|---|---|---|---|
| 2019/0147296 A1* | 5/2019 | Wang | G06F 18/2148 |
| | | | 382/157 |
| 2022/0082647 A1* | 3/2022 | Sharma | G01R 33/5608 |
| 2022/0245296 A1* | 8/2022 | Gharbi | G06N 3/047 |
| 2022/0245955 A1* | 8/2022 | Freeman | G06T 7/13 |
| 2022/0366242 A1 | 11/2022 | Tsunoda | |
| 2024/0078679 A1* | 3/2024 | Tsai | G06T 7/74 |

* cited by examiner

SYSTEM AND METHOD FOR SEGMENT-AWARE SEMANTIC SEGMENTATION

FIELD

The present invention relates to semantic segmentation in general and to semantic segmentation usage in aerial images in particular.

BACKGROUND

Semantic segmentation is the task of classifying and grouping together pixels of an image based on defined categories (classes). Each pixel in the image is classified to a category by labelling it with a label indicating a specific class. Each category represents one type of object and is separately classified to one of the categories. Neighbouring pixels of the same class are grouped together into a segment.

FIG. 1A, to which reference is now made, includes an exemplary aerial image 10 and a semantic segmentation result 15, that can be created by current semantic segmentation systems, identifying tanks on areal image 10.

Known semantic segmentation solutions are based on Deep Convolutional Neural Network (DCNN) models such as Fully Convolutional Networks (FCN), Pyramid Scene Parsing Network (PSPNet), SegNet, U-Net and the like.

The process of DCNN-based semantic segmentation includes a training phase in which the DCNN is trained to segment the various categories using images and their already prepared segmentation data (annotations); a validation and/or test phase in which the DCNN is evaluated to determine the quality of the model (network) created in the training phase and an inference phase in which the DCNN is used to perform sematic segmentation of a new image and provide a segmentation result.

The training phase is the process of fitting the DCNN model to a given dataset of images by optimizing various parameters of the neural network using an optimization algorithm that operates on a dataset of samples (training data), each sample is a pair of an image and its preprepared ground truth annotation mask (the ground truth annotation mask contains the correct segmentation of the image, each pixel is associated with the label of the correct class).

During the training phase the optimization algorithm repeatedly operates on one or more samples, that may be grouped into a batch of samples, and modifies the DCNN model to improve the classification results until the DCNN model is good enough (for a specific purpose).

The training process (performed on each batch), includes a forward propagation step where the DCNN creates a segmentation result for each image in the batch; a loss function computation step where the distance (loss value/error) between the segmentation result (created by the DCNN) and the preprepared ground truth annotation mask (provided in the sample) is calculated; and a back propagation step where the various parameters of the DCNN are modified possibly using a gradient descent optimisation algorithm step, aiming to find a local minimum of the loss function.

It may be appreciated that the various operations described herein as being performed on an image may be similarly performed on a batch of images, but for simplicity and clarity of the text, the term image used throughout this document may be understood as one or more images.

The loss value indicates the distance between the segmentation result and the preprepared ground truth annotation masks, and measures how well the DCNN models the training data. A smaller loss value indicates a better classification of the pixels in the image.

The loss functions used for semantic segmentation are mostly based on a per-pixel loss calculation and a per image aggregation, such as the sum or the average of all the per-pixel loss values of the entire image.

One example of a per-pixel loss functions used in DCNN for semantic segmentation computes a cross-entropy loss that measures the distance between the value of the pixels of the segmentation result and the value of the pixels of the ground truth annotation mask, where the objective is to optimize the classification accuracy of each pixel by minimizing the average of the loss value of all the pixels in the image.

Another example of a per-pixel loss functions used in DCNN for semantic segmentation computes a weighted cross-entropy loss. The weighted cross-entropy loss considers a different weight for different pixels in the entire image and computes the weighted distance between the value of the pixels of the segmentation result (considering the weight of each pixel) and the value of the pixels of the ground truth annotation mask. Here, the objective, which is to optimize the accuracy of classification of pixels of specific classes, is achieved by increasing their weights compared to pixels of other classes in the image. Here again, the main goal is to optimize the classification accuracy of each pixel while giving higher importance to the optimization of some of the pixels. This is done by minimizing the weighted average of the loss value of all the pixels in the image.

Another example of a per-pixel loss functions used in DCNN for semantic segmentation computes a focal loss that provides a different focus to specific pixels. In this example, the objective is to optimize the accuracy of classification of pixels that are difficult to classify, and again the main goal is to optimize the classification accuracy of each pixel by minimizing the average value of the loss value of all the pixels in the image.

The validation and/or test phases are the processes of evaluating the DCNN model to determine the quality of the network by measuring the quality of the actual semantic segmentation results. The DCNN is given samples from a validation dataset, each sample is a pair of an image and its preprepared ground truth annotation mask (like the samples in the training phase) and the DCNN creates for each image its segmentation result.

During the validation and/or test phases one or more metric functions may be used to evaluate the quality of the semantic segmentation. The evaluation is done by comparing the segmentation result with the given ground truth annotation mask.

The metric functions used for semantic segmentation are mostly based on a per-pixel calculation, and compute a per image metric as a sum or an average of all the per-pixel metric values of the entire image.

Metric functions may compute any one or combination of quality parameters including: precision (the ratio between the number of True-Positive classified objects (which can be for example, pixels or segments) and the total number of Positive, both True and False, classified objects); recall (detection rate, ratio between the number of Positive objects correctly classified as Positive to the total number of Positive objects); accuracy (ratio of correct classification across all classes between the number of correct classified objects to the total number of objects); intersection over union (IoU) (ratio between the overlapping (intersection) True-Positive classified pixels and the ground truth annotation mask and the union of the True-Positive classified pixels and the ground truth annotation mask and the like.

Prior art loss and metric functions for semantic segmentation are implemented as an aggregation (e.g., sum or average) of per-pixel calculated values ignoring other possible properties of a pixel, such as being part of a specific segment. This overlooking may result in some cases in an inferior classification.

For example, the per-pixel loss and metric function may not be optimal when the objective is to detect as many segments as possible of each specific class (in contrast to classifying correctly as many pixels as possible, ignoring the segment to which they belong), i.e., when the main objective is to have a high recall in terms of segments.

An example of the disadvantage of using a per-pixel loss and metric functions is illustrated in FIG. 1B, to which reference is now made. Image 10 contains 7 tanks. The DCNN identified only 5 out of the 7 tanks and semantic segmentation result 15 contains only 5 segments, failing to identify and segment tanks 11 and 12 of image 10.

SUMMARY

There is provided, in accordance with an embodiment of the present invention, a computer-implemented method for updating a machine learning model for semantic segmentation. The method includes receiving an image and a segment ID mask, the image consists of a plurality of pixels, and the segment ID mask contains for each pixel of the image one of a plurality of segment identifiers identifying a segment to which the pixel belongs. The method further includes feeding the image to a machine learning model and computing an outcome, computing a per-segment value for each one of the plurality of segment identifiers from the outcome and from pixels associated with the one of the plurality of segment identifiers, aggregating a plurality of per-segment values to create a segment-aware value and using the segment-aware value for training the machine learning model, validating the machine learning model and testing the machine learning model.

Additionally, in accordance with an embodiment of the present invention, the machine learning model is a deep convolution network.

Moreover, in accordance with an embodiment of the present invention, the outcome includes for each pixel a per-pixel value.

Further, in accordance with an embodiment of the present invention, the outcome is a per class probability map containing for each pixel a probability of belonging to a specific class, the per-segment computed value is a per-segment loss value, and the segment-aware value is a segment-aware loss value and the step of computing further includes computing for each one of the plurality of pixels a per-pixel loss value between a ground truth annotation mask and the per class probability map, where the ground truth annotation mask contains for each pixel a correct class and computing a per-segment loss value for each one of the plurality of segment identifiers from a plurality of per-pixel loss values of pixels associated with the one of the plurality of segment identifiers.

Still further, the step of computing a per-segment loss value includes for each segment selecting K pixels from a plurality of pixels associated with the identifier of the segment having a smallest per-pixel loss value and selecting a highest value from the K selected pixels.

Additionally, in accordance with an embodiment of the present invention, the method further includes calibrating the per-segment loss value.

Moreover, in accordance with an embodiment of the present invention, the calibrating is multiplying by a known value associated with each segment identifier.

Further, in accordance with an embodiment of the present invention, the outcome is a segmentation result that contains for each pixel a predicted class, the per-segment value is a per-segment metric value and the segment-aware value is a segment-aware metric value, and where the step of computing further includes computing for each one of the plurality of pixels a per-pixel metric value using a ground truth annotation mask and the segmentation result, where the ground truth annotation mask contains for each pixel a correct class, and computing a per-segment metric value for each one of the plurality of segment identifiers using a plurality of per-pixel metric values of pixels associated with the one of the plurality of segment identifiers.

Still further, in accordance with an embodiment of the present invention, the computing a per-segment metric value includes counting for each segment a number of correctly classified pixels, wherein a correctly classified pixel is a pixel having a predicted class in the segmentation result identical to a correct class in the ground truth annotation mask and where the segment-aware value is a ratio between the number of segments for which at least a predetermined number of pixels were classified correctly and a total number of segments present in the ground truth annotation mask.

Additionally, in accordance with an embodiment of the present invention, the method of claim further includes assigning a segment identifier of a first pixel to a plurality of other pixels located at a certain distance from the first pixel.

There is provided, in accordance with an embodiment of the present invention, a computer-implemented system for updating a machine learning model for semantic segmentation. The system includes at least one memory, at least one processor communicatively coupled to the memory and a segment-aware semantic segmentation unit, operated by the at least one processor. The segment-aware semantic segmentation unit is configured to receive an image and a segment ID mask, where the image consists of a plurality of pixels, and the segment ID mask contains for each pixel in the image one of a plurality of segment identifiers identifying a segment to which the pixel is associated, compute a segment-aware value using the image and the segment ID mask, and use the segment-aware value for training the machine learning model, validating the machine learning model and testing the machine learning model.

Additionally, in accordance with an embodiment of the present invention, the segment-aware semantic segmentation unit further includes a segment-aware function unit configured to compute a segment-aware value, a semantic segmentation machine learning model, a training unit configured to train the semantic segmentation machine learning model using the segment-aware value, a validation unit configured to provide a metric indicative of the quality of the semantic segmentation machine learning model using the segment-aware value and an inference unit configured to use the semantic segmentation machine learning model and provide a segment-aware segmentation result.

Moreover, in accordance with an embodiment of the present invention, the machine learning model is a deep convolution network.

Additionally, the segment-aware function unit further includes a segment-aware loss module configured to compute a loss value and a segment-aware metric module configured to compute a metric value.

Furthermore, in accordance with an embodiment of the present invention, the segment-aware loss module is configured to compute for each one of the plurality of pixels a per-pixel loss value between a ground truth annotation mask containing for each pixel a correct class, and a per class probability map containing for each pixel a probability of belonging to a specific class and compute a per-segment loss value for each one of the plurality of segment identifiers using a plurality of per-pixel loss values of pixels associated with the one of the plurality of segment identifiers.

Still further, in accordance with an embodiment of the present invention, the segment-aware loss module is configured to compute the per-segment loss value of each segment by selecting K pixels from a plurality of pixels associated with the identifier of the segment having a smallest per-pixel loss value and selecting a highest value from the K selected pixels.

Additionally, in accordance with an embodiment of the present invention, the segment-aware loss module is further configured to calibrate the per-segment loss value.

Moreover, in accordance with an embodiment of the present invention, the segment-aware metric module is further configured to compute for each one of the plurality of pixels a per-pixel metric value using a ground truth annotation mask containing for each pixel a correct class, and the segmentation result containing for each pixel a predicted class, and compute a per-segment metric value for each one of the plurality of segment identifiers using a plurality of per-pixel metric values of pixels associated with the one of the plurality of segment identifiers.

Furthermore, the segment-aware metric module is configured to count for each segment a number of correctly classified pixels where a correctly classified pixel is a pixel where a predicted class in the segmentation result is identical to a correct class in the ground truth annotation mask and compute the segment-aware value as a ratio between the number of segments for which at least a predetermined number of pixels were classified correctly and a total number of segments present in the ground truth annotation mask.

BRIEF DESCRIPTION OF THE DRAWINGS

The invention may be understood by reference to the following detailed description when read with the accompanying drawings in which.

Figure 1A:
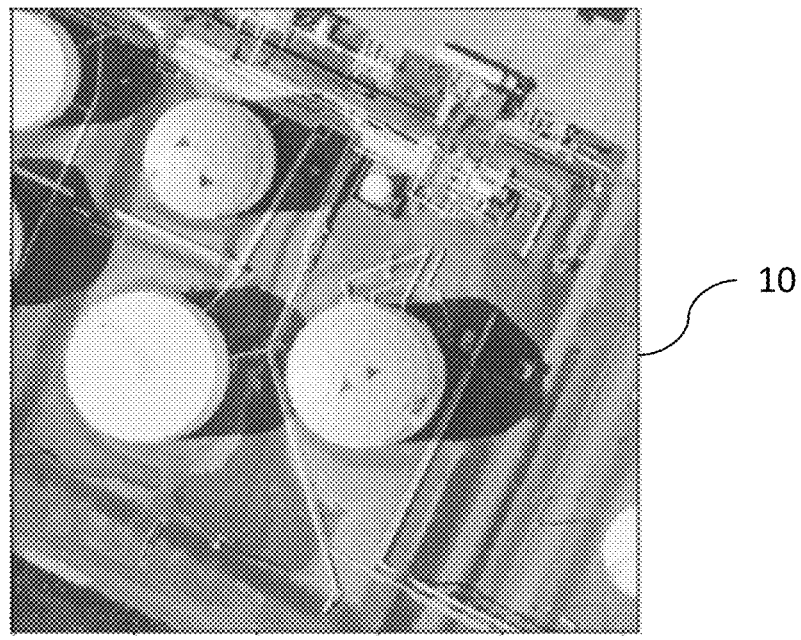
FIG. 1A is a schematic illustration of an exemplary aerial image and a semantic segmentation result using a state of the art machine learning model.

It will be appreciated that for simplicity and clarity of illustration, elements shown in the figures have not necessarily been drawn to scale. For example, the dimensions of some of the elements may be exaggerated relative to other elements, for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, features and components have not been described in detail so as not to obscure the present invention. In the accompanied drawings, similar numbers refer to similar elements in different drawings.

Methods and systems according to embodiments of the present invention are directed at enhancing the functionality of semantic segmentation to receive and consider information related to pixel-segment association (in addition to the per-pixel loss and the per-pixel metric) when computing the loss value during the training of a machine learning model and when computing various metrics during the validation and test phases.

Embodiments of the present invention provide methods and systems for creating a machine learning model for sematic segmentation with high precision, high detection accuracy and high recall in terms of identified segments compared to the ground truth annotation mask by providing segment-aware loss functions and segment-aware metric functions capable of optimizing segment-based loss and various segment-based metrics (in addition or instead of per-pixel loss function and per-pixel metrics functions) of an image.

The machine learning model may be any program that can be trained to perform semantic segmentation including a neural network such as a convolution neural network, a deep convolution neural network and the like. During training, a machine learning model is optimized to find certain patterns or outputs from the dataset and the output of this process is a set of specific rules and/or parameters and/or data structures that is referred as the machine learning model.

Figure 2A:
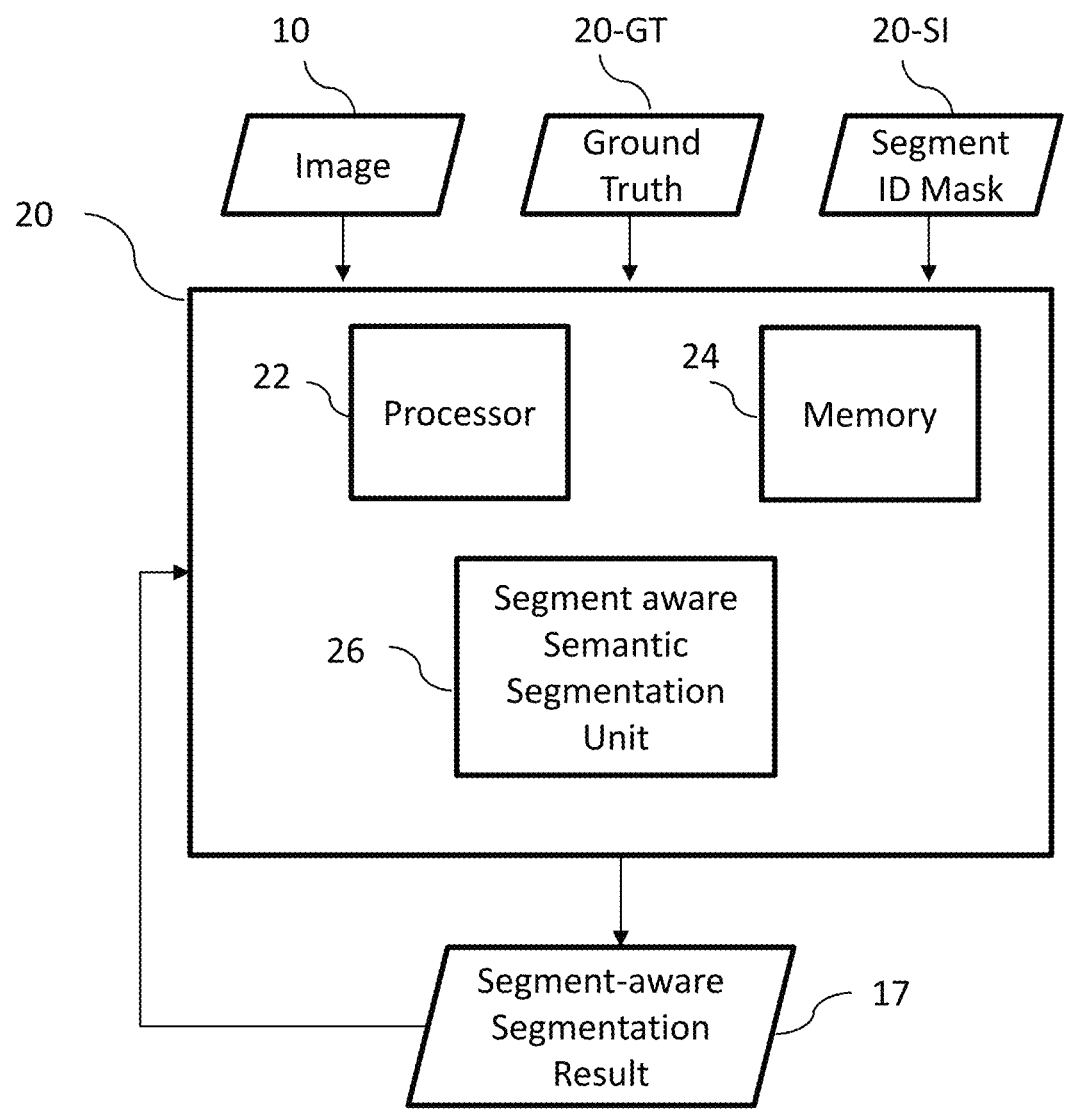
FIG. 2A is a schematic illustration of a system capable of performing segment-aware semantic segmentation, constructed and operative in accordance with an embodiment of the present invention.

FIG. 2A, to which reference is now made, is a schematic illustration of a system 20 capable of performing segment-aware semantic segmentation, constructed and operative in accordance with an embodiment of the present invention. System 20 comprises one or more modules containing a processor 22 and one or more modules containing a memory unit 24 with circuitry, interfaces, and/or code that may be configured to operate segment-aware semantic segmentation unit 26 for a multi-class semantic-segmentation task.

System 20 may receive as input an image 10 (for which semantic segmentation is required), a preprepared ground truth annotation mask 20-GT and a segment ID mask 20-SI.

The segment ID mask is an image that provides a pixel-segment association by assigning to each pixel in the image the unique identifier (ID) of the segment to which it belongs (the ID may be unique the context of a single image, or within the batch. The ID can also be made unique in the context of segments of the same class in the image/batch, in which case a unique ID is achieved by combining the class and the ID taken from the segment-ID mask). Segment ID mask 20-SI may be prepared in advance (preprepared) for each image 10 like ground truth 20-GT.

System 20 may pass the various input parameters to segment-aware semantic segmentation unit 26. Once trained, system 20 may create a segment-aware segmentation result 17 with a classification of each pixel of image 10 into a class of a set of classes and provide it as an output.

System 20 may be implemented on a physical server or as a plurality of distributed cloud-based resources using technologies that are well known to those skilled in the art. System 20 may be implemented on any computing device such as a web/cloud server, an application server, a media server, and the like. The input and output of system 20 may be stored in memory, in an external database and/or may be received and sent over a wireline or wireless communication or may be provided to and from system 20 by other available means.

Figure 2B:
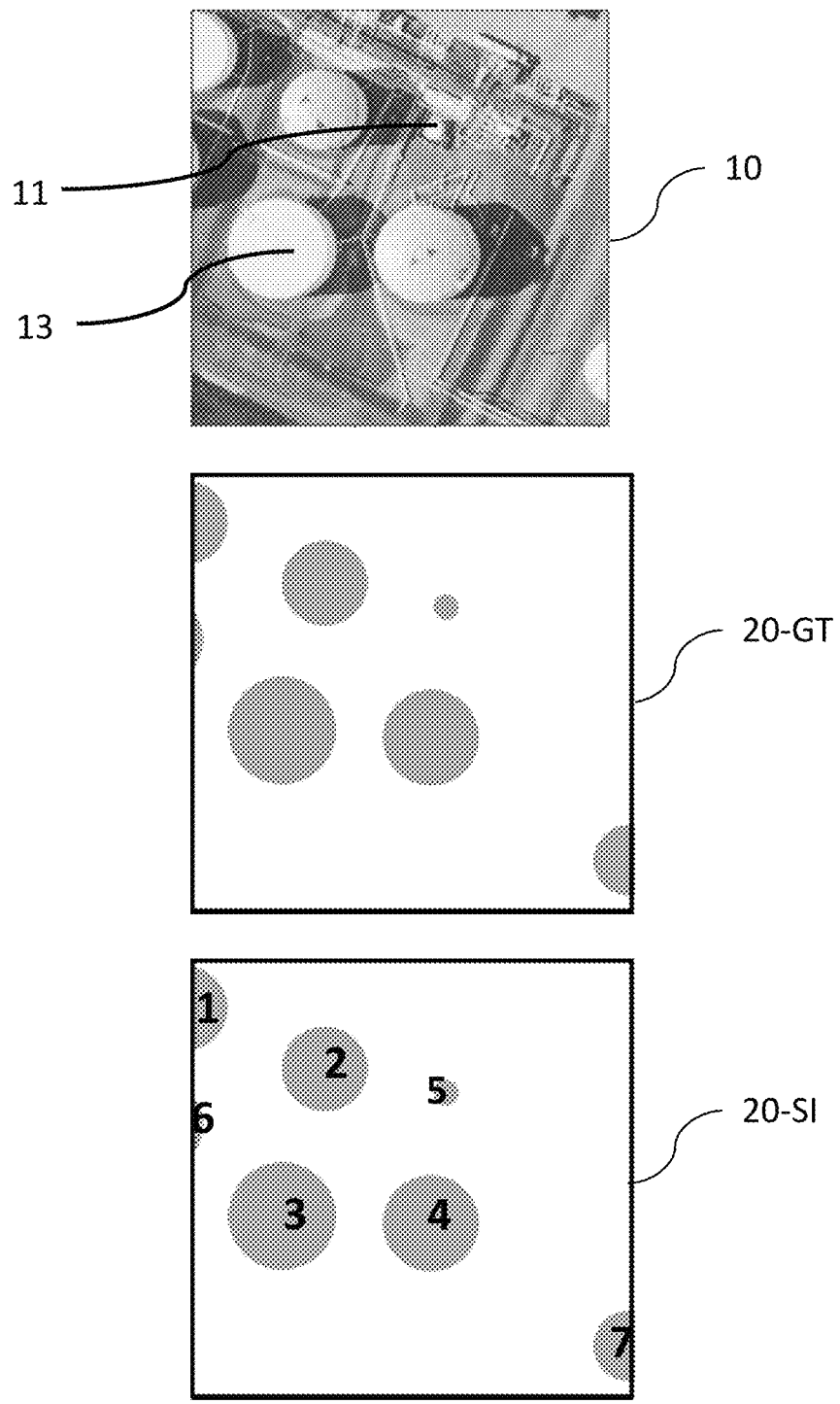
FIG. 2B is a schematic illustration of the input data to the system of FIG. 2A.

FIG. 2B, to which reference is now made, provides examples of the input parameters of system 20. Image 10, is an exemplary aerial image containing tanks to be identified and segmented. Ground truth annotation mask 20-GT is the preprepared ground truth annotation mask containing 7 segments representing the tanks of image 10 and segment ID mask 20-SI is the preprepared segment ID mask that provides for each pixel a unique identification of a segment to which it belongs. For example, all pixels of tank 11 have an ID 5 and all pixels of tank 13 have an ID 3.

Figure 3:
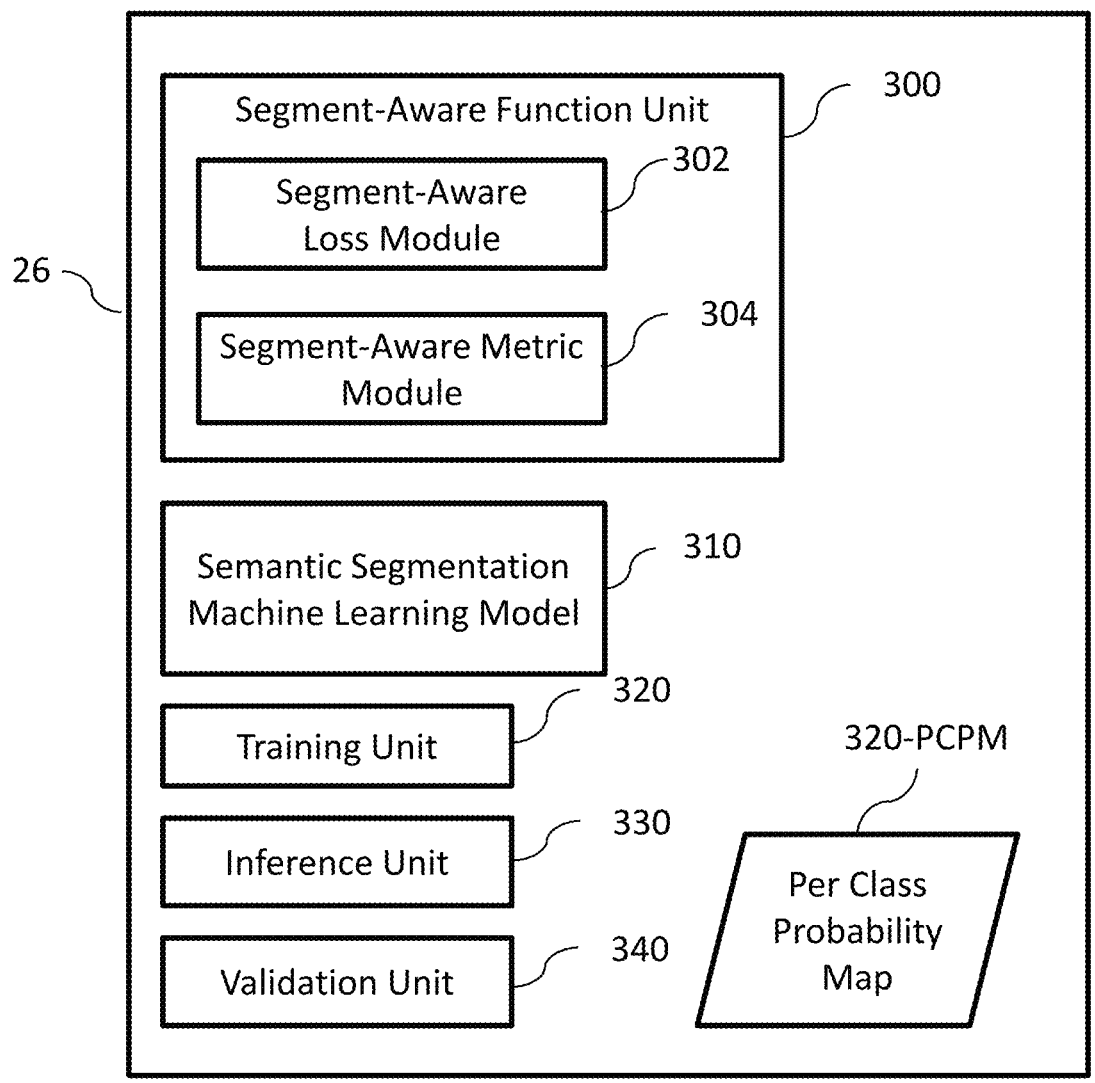
FIG. 3 is a schematic illustration of segment-aware semantic segmentation unit constructed and operative in accordance with an embodiment of the present invention.

FIG. 3, to which reference is now made, is a schematic illustration of segment-aware semantic segmentation unit 26, constructed and operative in accordance with an embodiment of the present invention. Segment-aware semantic segmentation unit 26 comprises a segment-aware function unit 300, a semantic segmentation machine learning model 310, a training unit 320, an inference unit 330 and a validation unit 340.

Segment-aware function unit 300 comprises a segment-aware loss module 302 configured to implement a segment-aware loss function and a segment-aware metric module 304 configured to implement a segment-aware metric function. The input to segment-aware function unit 300 may be segment ID mask 20-SI, image 10, ground truth annotation mask 20-GT, probability map 320-PCPM, and segment-aware segmentation result 17. Probability map 320-PCPM is an output of the model and shows the probability of each pixel belonging to a specific class. Segment-aware loss module 302 and segment-aware metric module 304 may use any of the input parameters and ignore any of the input parameters as described in detail herein below.

Segment-aware loss module 302 may be configured to compute a segment-aware loss value that may be used in the training phase, i.e., by training unit 320. Segment-aware metric module 304 may be configured to compute various segment-aware metrics that may be used in the validation and test phases, i.e., by validation unit 340, and during the training phase, i.e., by training unit 320.

It may be appreciated that, segment-aware function unit 300 may use any of the traditional loss functions (that are not segment-aware) and ignore any of the input parameter while computing the loss value (e.g., ignoring segment ID mask 20-SI) and still compute a segment-aware metric value and use it in the validation and test phases to evaluate the overall quality of the model with respect to segments. It may also be appreciated that segment-aware function unit 300 may use any combination of traditional metric functions and loss functions.

Semantic segmentation machine learning model 310 may be any neural network with one or more layers, and one or more nodes in each layer or any other type of a machine-learning model.

Training unit 320 may be configured to train semantic segmentation machine learning model 310 to classify the pixels of image 10 using ground truth annotation mask 20-GT and segment ID mask 20-SI. During the training, training unit 320 may create at each iteration a per class probability map 320-PCPM intermediate result, use segment-aware loss module 302 to compute the segment-aware loss value (between the probability-map 320-PCPM created for image 10 by the semantic segmentation machine learning model 310, and the ground truth annotation mask 20-GT, optionally using information provided in segment ID mask 20-SI) and use it, optionally with any traditional pixel-aware loss value, to update the parameters of semantic segmentation machine learning model 310.

Training unit 320 may process each sample (image) separately or process a batch of samples, during which the intermediate result, per class probability map 320-PCPM, may be created and used to improve the model of semantic segmentation machine learning model 310.

Inference unit 330 may be configured to receive at each iteration image 10 and create segment-aware segmentation result 17.

Validation unit 340 may be configured to receive image 10, ground truth annotation mask 20-GT, and segment-ID mask 20-SI, and compute the various quality metrics using segment-aware metric module 304, optionally in addition to known in the art metric functions that compute pixel-aware metric values. Validation unit 340 may be used for validation and/or for testing.

Figure 4:
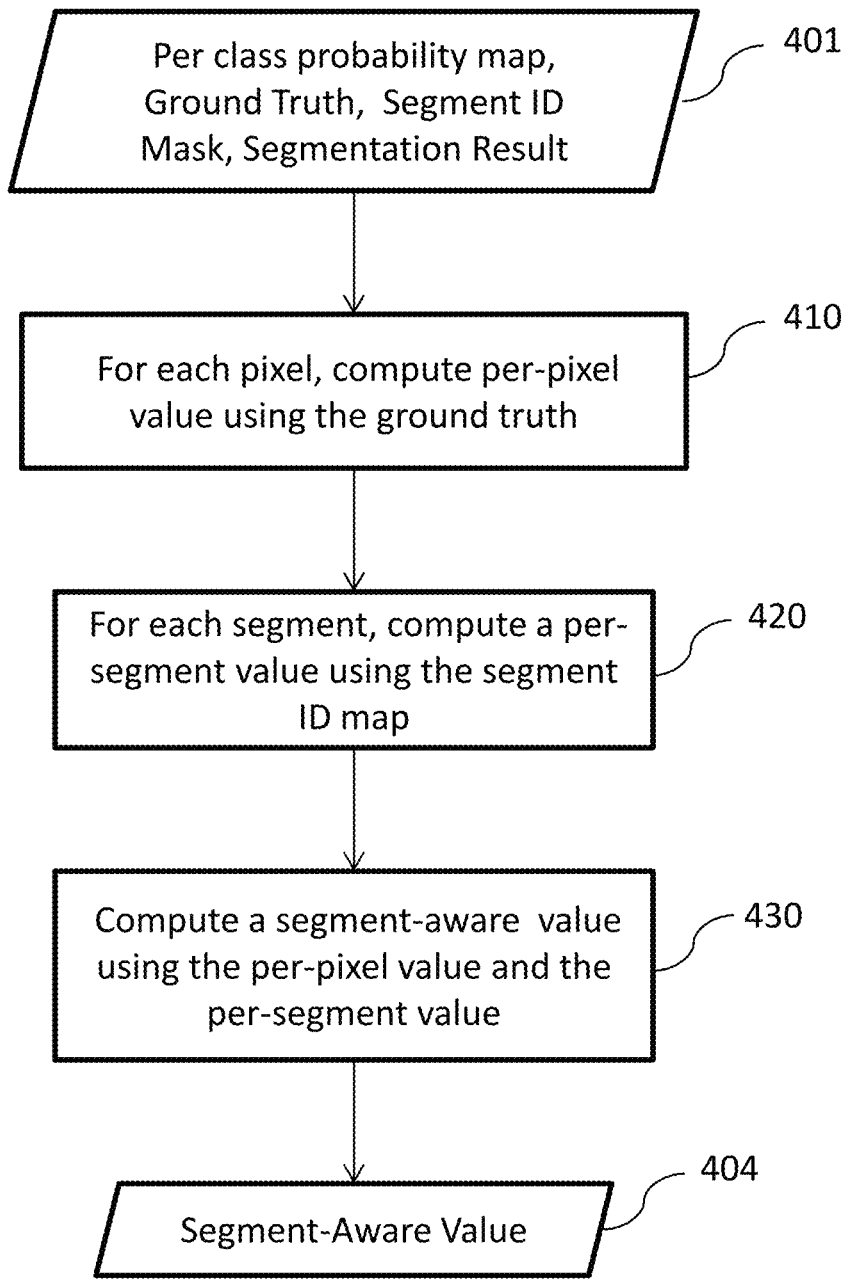
FIG. 4 is a schematic illustration of a method for computing a segment-aware value implemented by the segment-aware function unit of FIG. 3, operative in accordance with an embodiment of the present invention.

FIG. 4, to which reference is now made, is a method that may be implemented by segment-aware function unit 300 to compute a segment-aware value for a loss function during training and/or a metric function using the pixel-segment association information provided in segment ID mask 20-SI during test and validation.

In step 401, segment-aware function unit 300 may receive as input any combination of the following input parameters: per class probability map 320-PCPM created by semantic segmentation machine learning model 310 operating on image 10; ground truth annotation mask 20-GT, segment ID mask 20-SI and segment-aware segmentation result 17. When used for computing loss, segment-aware function unit 300 may use per class probability map 320-PCPM and ignore segment-aware segmentation result 17 and when used for computing metrics, segment-aware function unit 300 may use segment-aware segmentation result 17 and ignore per class probability map 320-PCPM. Segment-aware function unit 300 may receive empty (i.e., null) input parameters and use the relevant parameters only.

In step 410, segment-aware function unit 300 may compute for each pixel a per-pixel value using ground truth annotation mask 20-GT. When used by a loss function, the per-pixel value may be a per-pixel loss value and the computation may include any per-pixel computation method (e.g., cross-entropy loss; weighted cross-entropy loss; focal loss; and the like) to compute the per-pixel loss. When used by a metric function, the per-pixel value may be the per-pixel metric and the per-pixel value may be any metric (e.g., accuracy; precision; recall; IoU and the like).

In step 420 segment-aware function unit 300 may compute for each segment a per-segment value using segment ID mask 20-SI and potentially also the other inputs as well as the result of step 410.

In step 430, segment-aware function unit 300 may compute a segment-aware value using the per-pixel value and the per-segment value. Various implementations of steps 420 and 430 to compute the segment-aware value are detailed herein below. In step 404, segment-aware function unit 300 may provide a segment-aware value as output.

Segment-aware function unit 300 may consider a weight of the different pixels when a weight policy is defined. For example, if the weight of a pixel depends on the segment it belongs to, segment-aware function unit 300 may contain a configuration for mapping the segment-IDs to weights. The weight may be used when computing a loss of a pixel or when computing the loss of an entire segment. The actual use of the weights may be part of any combination of steps 410, 420, 430.

Segment-aware function unit 300 may support a hierarchy. The hierarchy may be segment—image—batch—dataset. Segment-aware function unit 300 may compute the value (loss and/or metric) per segment, then, aggregate the results per image, then aggregate the results per batch and so on, according to the defined hierarchy. The aggregation may be computed as an average, sum and like.

Training unit 320 and validation unit 340 may use the outcome of segment-aware function unit 300 in place of, or in conjunction with, any traditional loss value computed by any known in the art loss function and any traditional metric value computed by any known in the art metric function.

Figure 5:
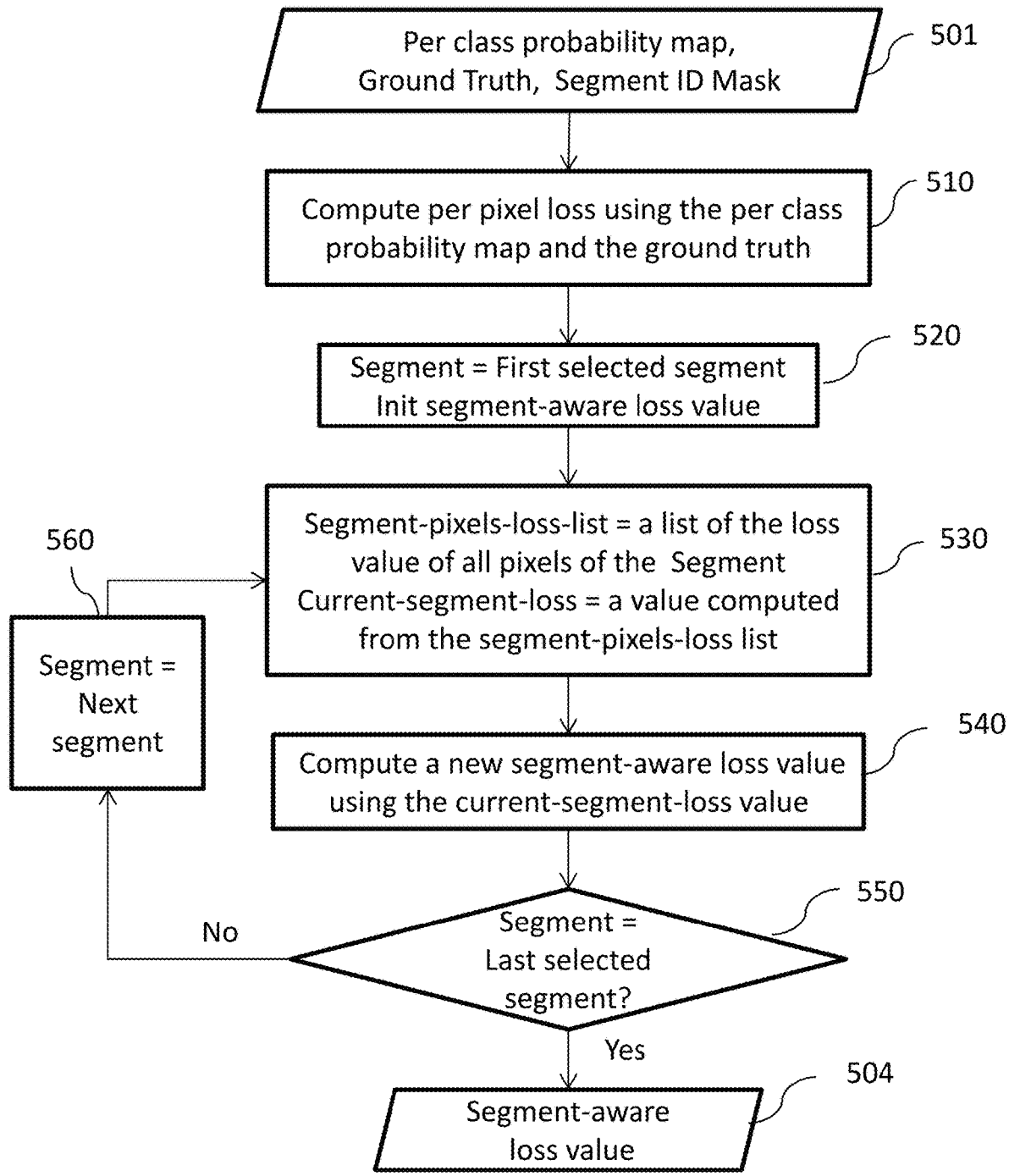
FIG. 5 is a schematic illustration of a method implemented by segment-aware segment-loss module of FIG. 3, operative in accordance with an embodiment of the present invention.

FIG. 5, to which reference is now made, is an exemplary embodiment of segment-aware loss function implemented by segment-aware loss module 302.

In steps 501 and 510 segment-aware function unit 300 may receive per class probability map 320-PCPM, ground truth annotation mask 20-GT and segment ID mask 20-SI and compute a per-pixel loss value (as mentioned herein above, a function implemented as part of segment-aware function unit 300 may ignore input parameters, and in this case, segmentation result 17 may be ignored).

In step 520, segment-aware loss module 302 may initiate the per-segment computation by setting the first segment to process and initiating a segment-aware loss value to zero. In step 530, segment-aware loss module 302 may use segment ID mask 20-SI to identify the pixels of the current segment and compute a current-segment-loss value from the per-pixel loss value of each pixel in the segment.

In step 540 segment-aware loss module 302 may add the current-segment-loss value to the segment-aware loss value and in step 550 segment-aware loss module 302 may check if the last segment has been handled. If not, segment-aware loss module 302 may advance to the next segment in step 560 and return to step 510 to compute a new current-segment-loss for the new segment. After the last segment is handled, segment-aware loss module 302 may provide in step 504 the segment-aware loss value, that may be used for example by training unit 320 (FIG. 3).

Steps 530 and 540 may be implemented in different ways, according to the main objective of sematic segmentation machine learning model 310 (FIG. 3) and perform other computations. In one embodiment, the main objective of semantic segmentation machine learning model 310 may be to optimize the recall value. In this case, the loss value (that reflects the quality of classification of each of the segments in the image) may be computed with respect to both each pixel and each segment.

Figure 5A:
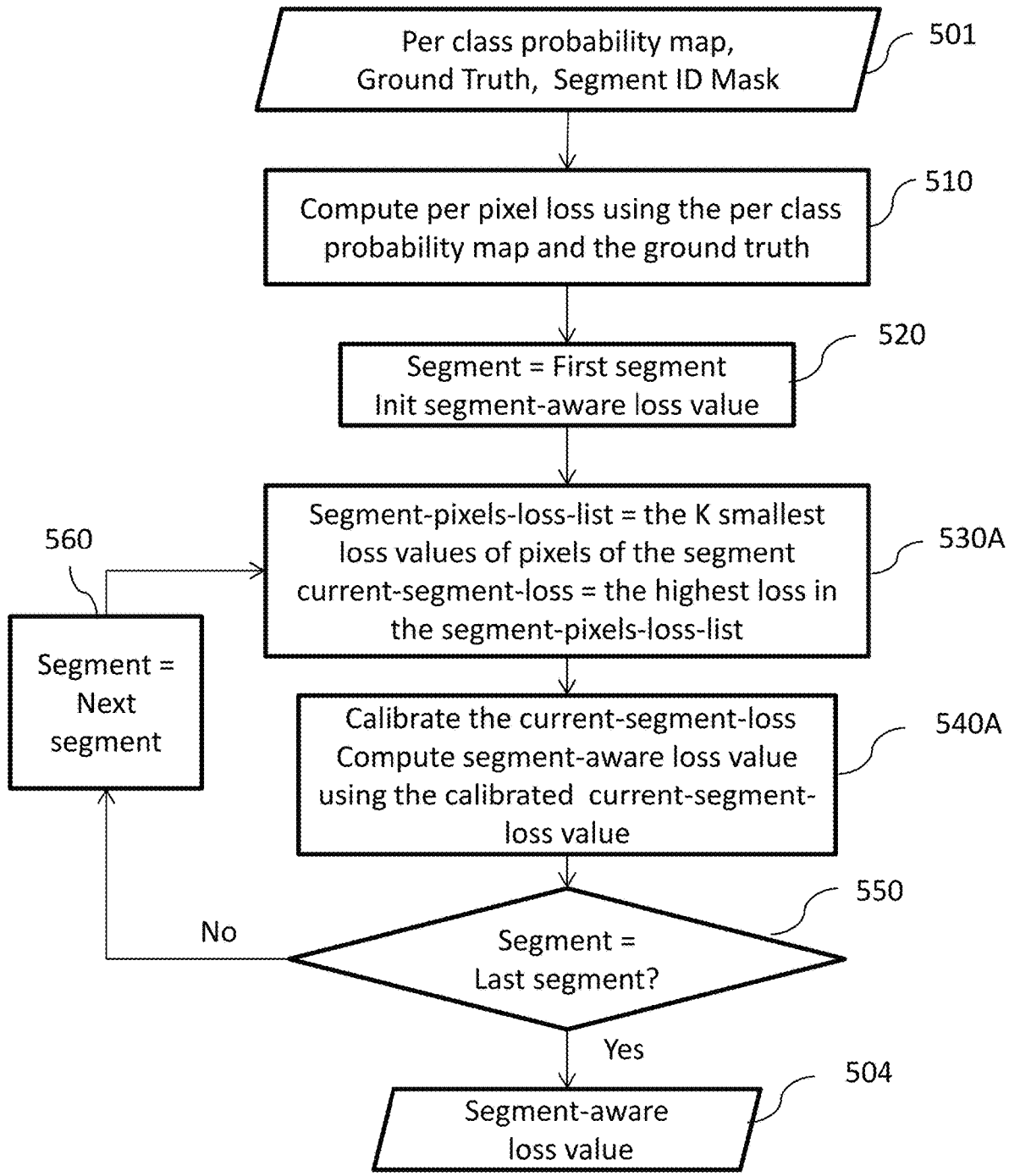
FIG. 5A is a schematic illustration of a flow implemented by segment-aware loss module of FIG. 3 optimized for segment-based recall value operative in accordance with an embodiment of the present invention.

FIG. 5A, to which reference is now made, is a schematic illustration of segment-aware loss module 302 (of FIG. 4) implementing a segment-aware loss function optimized for segment-based recall value.

In this embodiment, segment-aware loss module 302 may be configured to compute a loss value that may reflect the ability of the model to correctly classify at least K pixels of each segment. This loss module may optimize the model of semantic segmentation machine learning model 310 to both per-pixel and per-segment classification such that the optimization process may consider in addition to the loss of each pixel, a loss related to each entire segment.

Steps 530A and 540A of FIG. 5A describe one specific possible embodiment of the general flow illustrated in FIG. 5.

In step 530A segment-aware loss module 302 may identify the pixels of the segment and among them find the K pixels with the best (smallest) loss and select from these K pixels the highest per-pixel loss value. In step 540A segment-aware module unit 300 may apply a calibration module on the selected value. The calibration module may for example consider a specific weight to each segment for signifying a different importance related for example to their size, classification difficulty and the like. In this case, the calibration function may multiply each segment-aware value by a weight of the segment.

The calibration function may consider any information provided as input to segment-aware loss module 302 such as the value of each pixel, the pixel-segment association and the like and any configuration such as a weight of each segment and the like.

Other embodiments of segment-aware loss module 302 may be implemented. For example, the computation of the segment-aware loss value may use only a subset of the segments (and not to all of them). The subset may be selected randomly, according to segments' size, according to their location in the image, according to their importance, according to their segmentation difficulty or any other consideration.

Segment-aware loss module 302 may use different techniques to compute the segment-aware loss value of each segment such as computing an average of all pixel-level loss values of pixels in the segments (instead of the worst value among the best-K pixels) and the like.

Figure 6:
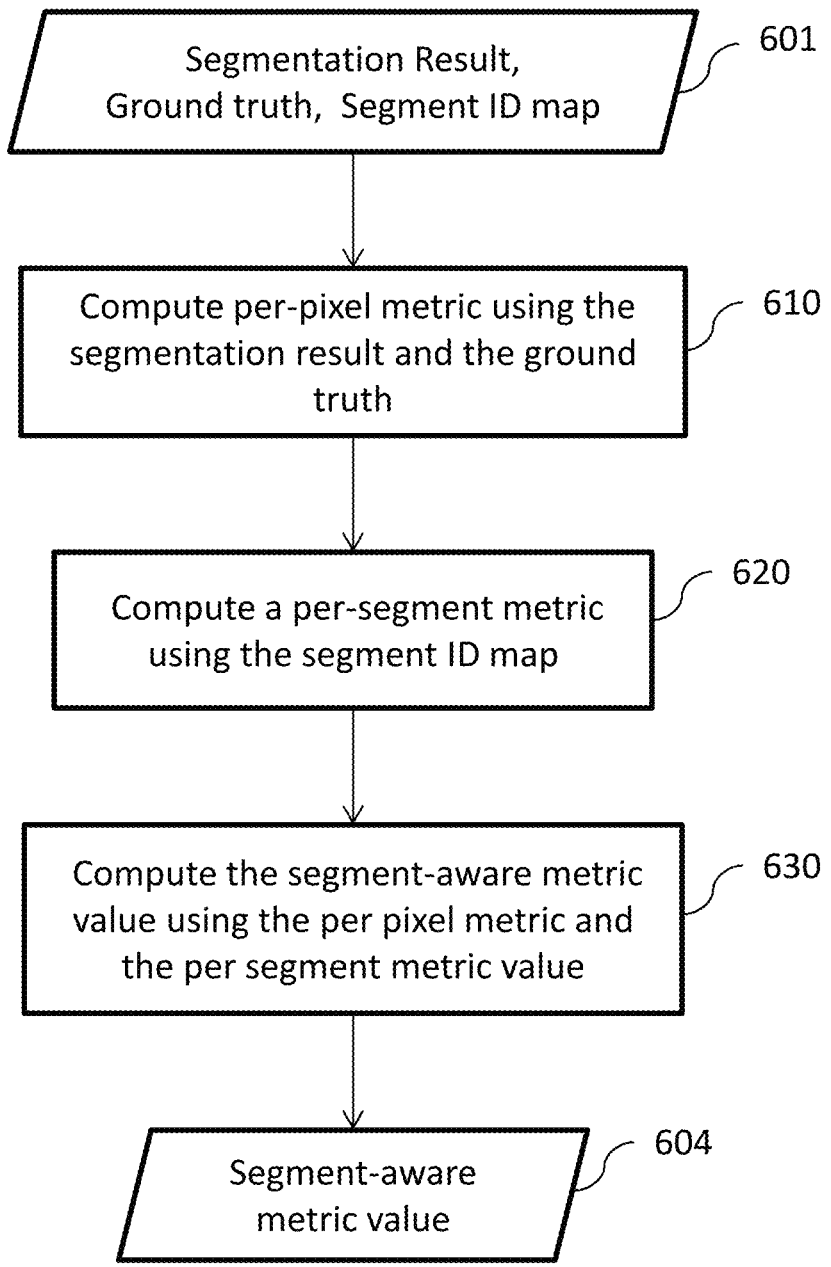
FIG. 6 is a schematic illustration of a method implemented by segment-aware metric module of FIG. 3, operative in accordance with an embodiment of the present invention.

FIG. 6, to which reference is now made, is an exemplary embodiment of a segment-aware metric function implemented by segment-aware metric module 304.

In steps 601 and 610 segment-aware metric module 304 may receive segmentation result 17, ground truth annotation mask 20-GT and segment ID mask 20-SI and compute a per-pixel metric value.

In step 620 segment-aware metric module 304 may compute a per-segment metric using segment ID mask 20-SI and possibly also the other inputs as well as the result of step 610. In step 630 segment-aware metric module 304 may compute the segment-aware metric value using the per-pixel metric values and the per-segment metric values and in step 604 provide the segment-aware metric value as an output.

Figure 6A:
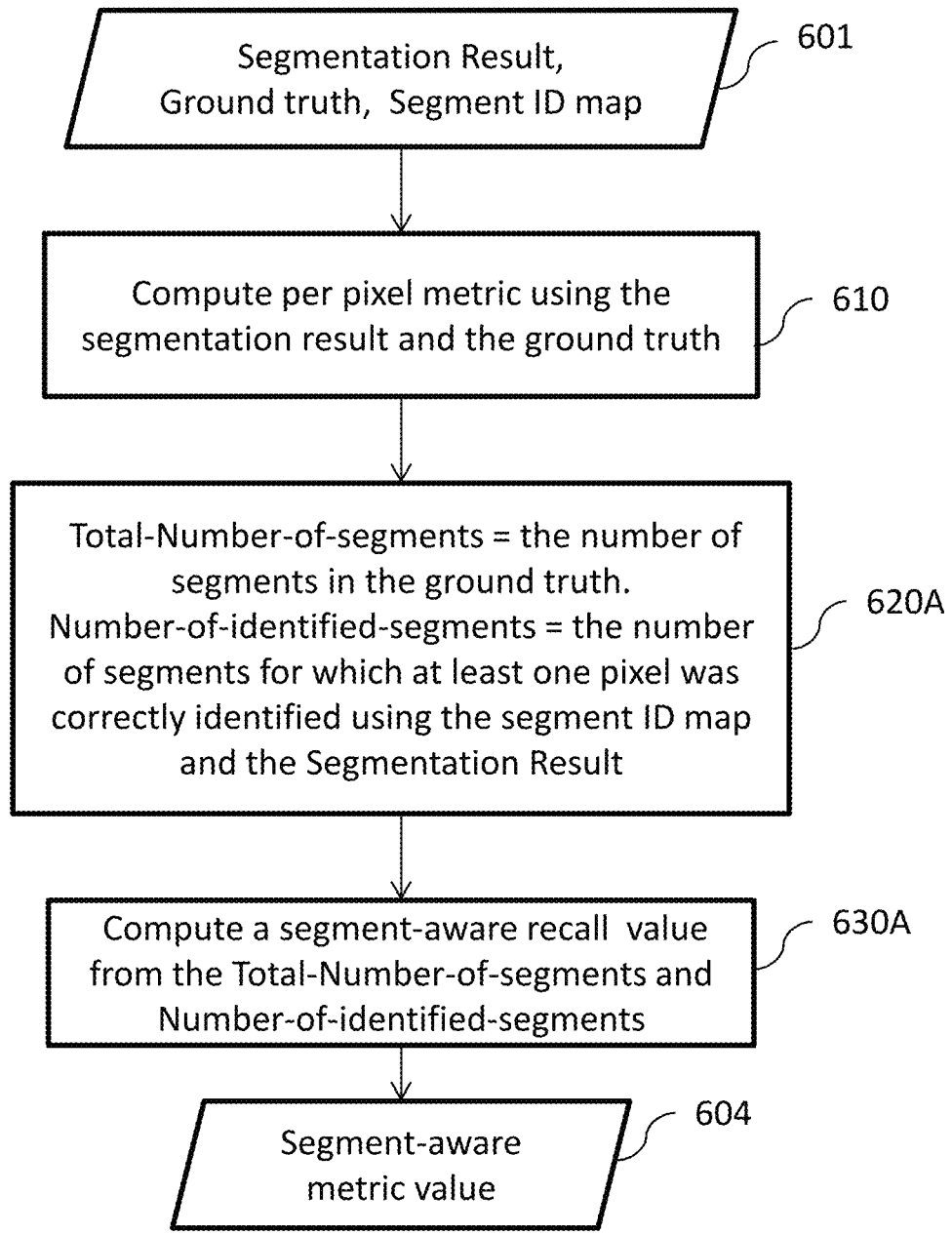
FIG. 6A is a schematic illustration of a flow implemented by a segment-aware metric module optimized for segment-based recall value operative in accordance with an embodiment of the present invention.

FIG. 6A, to which reference is now made, is a schematic illustration of segment-aware metric module 304 (of FIG. 4) optimized for segment-based recall value.

Steps 620A and 630A of FIG. 6A describe one specific possible embodiment of the general flow illustrated in FIG. 6.

In step 620A, segment-aware metric module 304 may compute the total number of the segments in ground truth annotation mask 20-GT and the number of identified segments for which at least one pixel exists in segmentation result 17 segment ID mask 20-SI.

In step 630A segment-aware metric module 304 may compute the segment-based recall value by dividing the number of identified segments by the total number of the segments to create the recall value.

In one embodiment, segment-aware metric module 304 may provide a coverage metric that may be defined as the average over the segments, of the percentage of pixels in the segment that was correctly classified. In another embodiment, segment-aware metric module 304 may consider a coverage-area that may regard all unclassified pixels located up to a certain distance from a correctly classified pixel in a segment as correctly classified and consider those pixels as true-positives and yet in another embodiment segment-aware metric module 304 may consider all pixels withing a convex-haul of correctly classified pixels in the segment as correctly classified and consider those pixels as true-positives.

In one embodiment segment-aware metric module 304 may compute a segment-aware IoU, where the IoU is computed separately for each segment and the segment-aware IoU metric is the average of all segments' IoU (instead of taking the sum of all overlapping pixels of all segments and dividing it by the sum of the pixels in the union of all segments).

Figure 7:
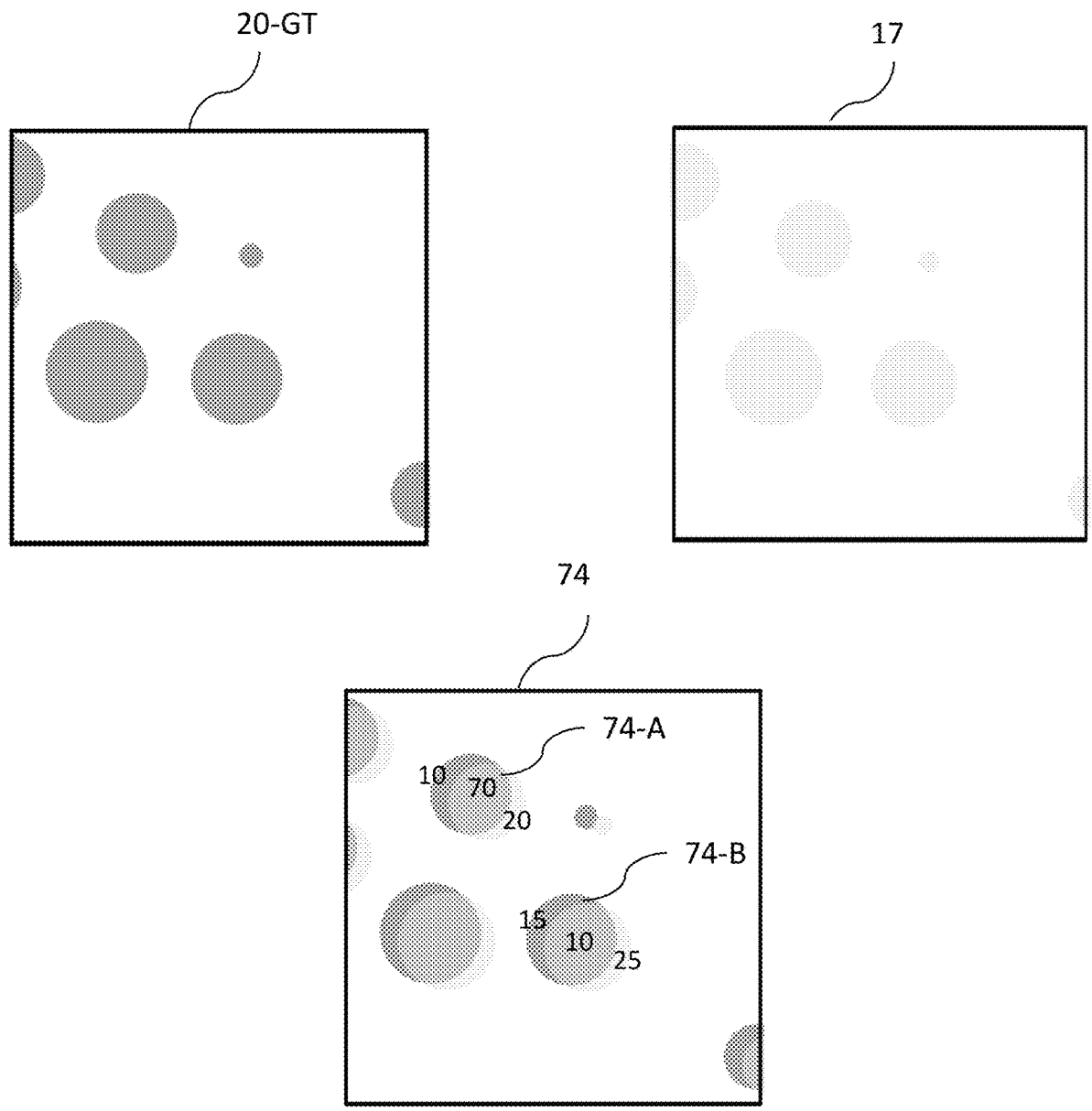
FIG. 7 is a schematic illustrates of an exemplary ground truth annotation mask and a segmentation result of an aerial image demonstrating the difference between an image-level IoU and a segment-aware IoU.

FIG. 7, to which reference is now made, schematically illustrates the exemplary ground truth annotation mask 20-GT (FIG. 2B) and a segmentation result 17 of image 10 used to demonstrate a difference between an image-level IoU and a segment-aware IoU.

Frame 74 includes both ground truth annotation mask 20-GT and segmentation result 17 to emphasize the intersection and the union between the segments of ground truth annotation mask 20-GT and the segments of segmentation result 17. In the example, the intersection between the ground truth and the segmentation result of tank 74-A has 70 pixels, the part of the ground truth that is not in the intersection has 10 pixels and the part of the segmentation result that is not in the intersection has 20 pixels. Similarly, the intersection between the ground truth and the segmentation result of tank 74-B has 10 pixels, the part of the ground truth that is not in the intersection has 15 pixels and the part of the segmentation result that is not in the intersection has 25 pixels.

In this example, the value of the image-level IoU metric (which is a solution, known in the art, used for semantic segmentation) computed as the sum of intersections divided by the sum of unions in this example is (70+10)/(100+50)=0.53. I.e., the sum of intersections (70 of tank 74-A plus 10 from tank 74-B) divided by the sum of unions (100=10+70+20) from tank 74-A plus (50=15+10+25) from tank 74-B). The segment-aware IoU metric, computed as an average of all segments' individual IoU, is ((70/100)+(10/50))/2=0.45 (e.g., the average of the IoU of tank 74-A and the IoU of tank 74-B).

In one embodiment segment-aware function unit 300 may be configured to associate pixels that are close enough to a segment, to that same segment in order to enable computing the segment-aware IoU metric. Segment-aware function unit 300 may first create a new containing segment ID mask that may assign the segment ID to segment's neighboring pixels.

Figure 8:
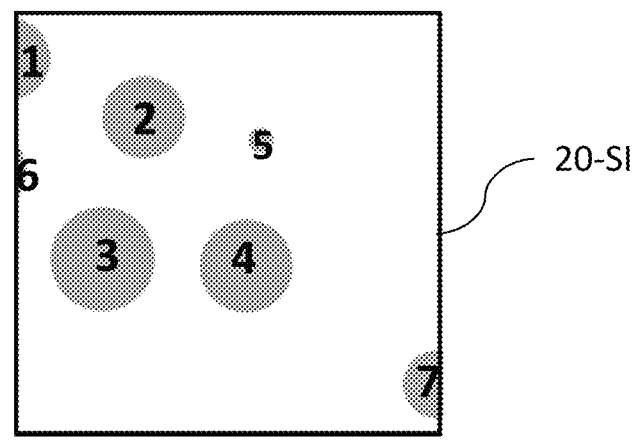
FIG. 8 is a schematic illustration of an exemplary segment ID mask and containing segment ID mask used for computing the segment-aware IoU.
Figure 8:
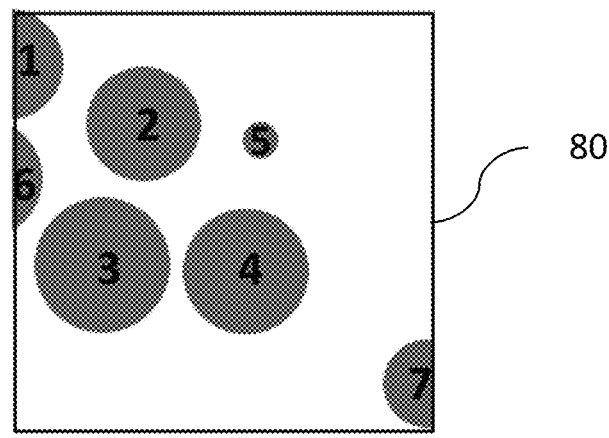
Figure 8:
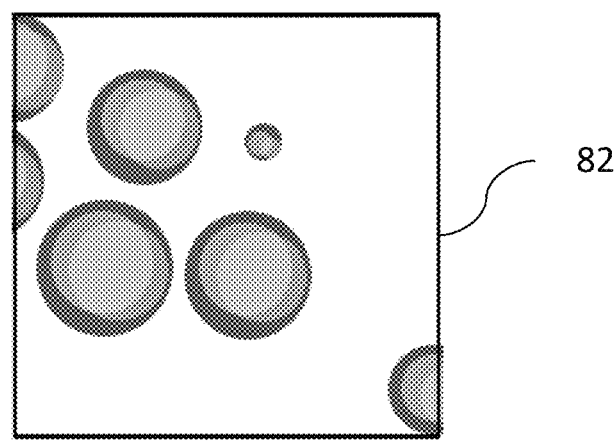

FIG. 8, to which reference is now made, schematically illustrates an original segment ID mask 20-SI, a containing segment ID mask 80 where adjacent pixels are attached to the segment and assigned the same ID and an exemplary outcome 82 used for computing the segment-aware IoU using the containing segment to identify the segment ID of pixels in result 17 that are not in the range of the original ground truth boundaries used for creating segment ID mask 20-SI. Segment ID mask 80 may provide the association between pixels of semantic segmentation result 15 that may be located outside the ground truth annotation mask and the segment to which they belong to enable computing the individual IoU of each segment.

Figure 1A:
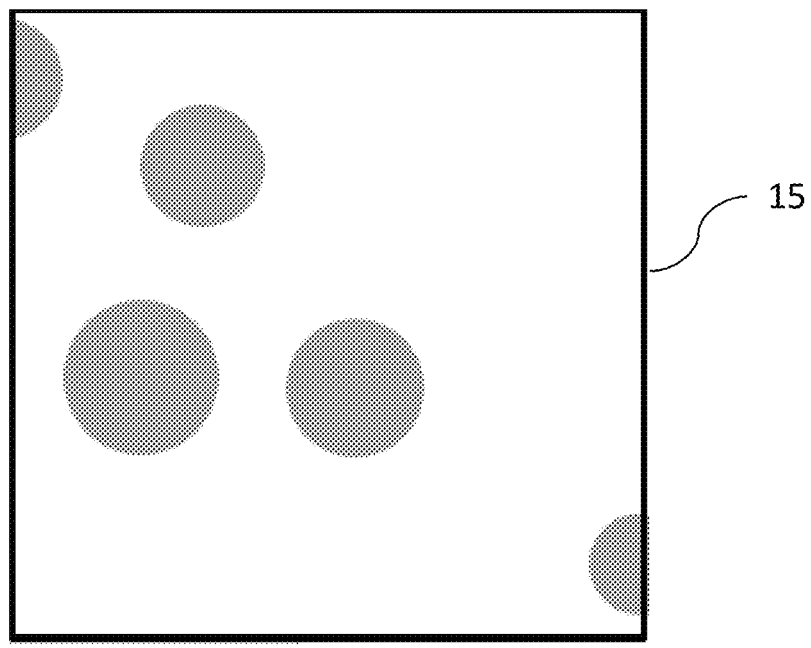
Figure 1B:
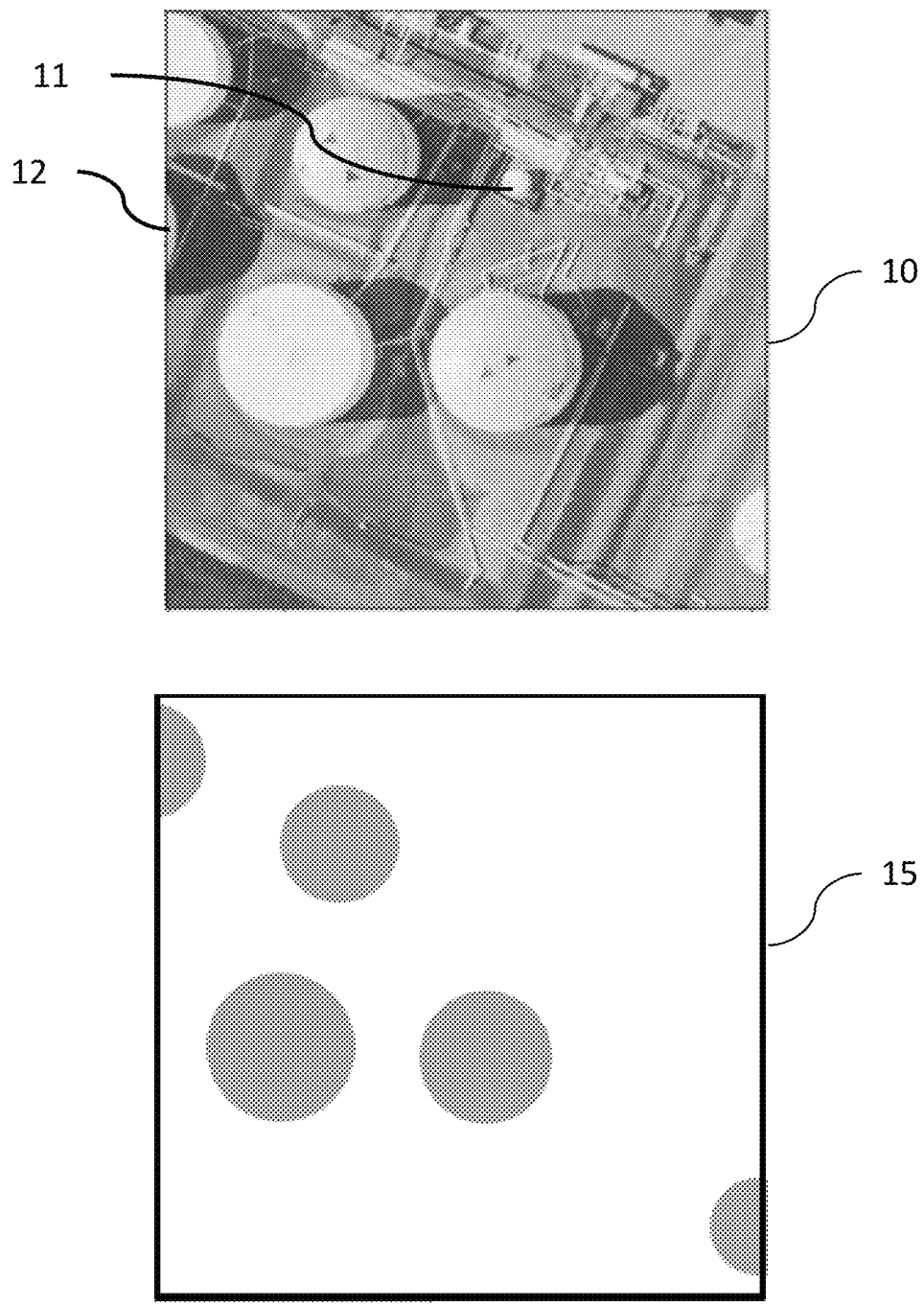
FIG. 1B pinpoint segments in the areal image that are not identified in the semantic segmentation result.
Figure 9:
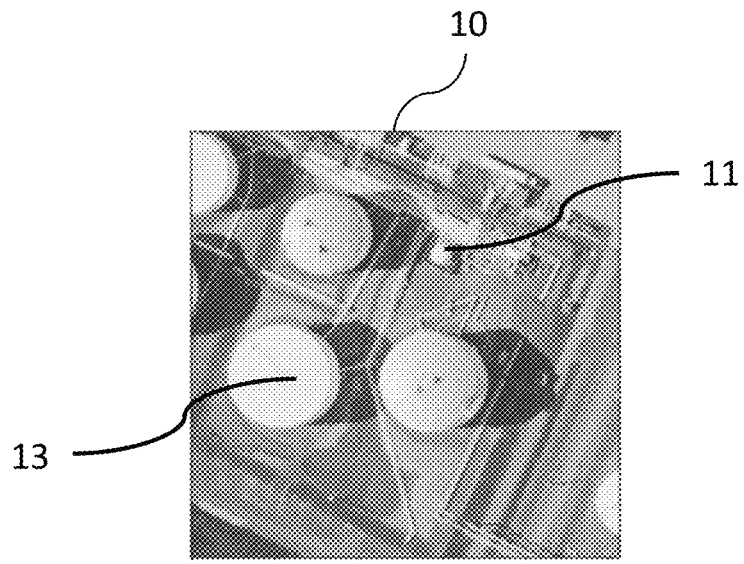
FIG. 9 is a schematic illustration of an aerial image and a segmentation result obtained by a semantic segmentation model and a segment-aware sematic segmentation model.
Figure 9:
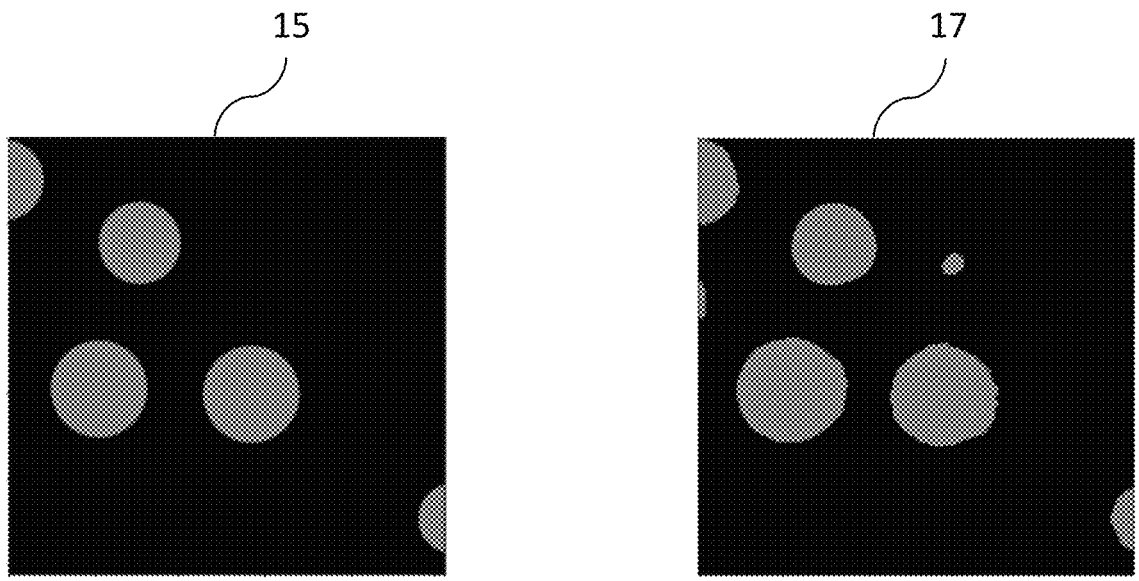

FIG. 9, to which reference is now made, includes the same exemplary aerial image 10 and segmentation result 15 of FIG. 1 and an additional segment-aware segmentation result 17. It may be noted that the classification of the pixels of the various tanks in segment-aware semantic segmentation result 17 may be less accurate than the one of semantic segmentation result 15, however, all 7 tanks of image 10 were correctly identified in segment-aware segmentation result 17 while only 5 of them (out of the 7) were correctly identified in semantic segmentation result 15.

Figure 10:
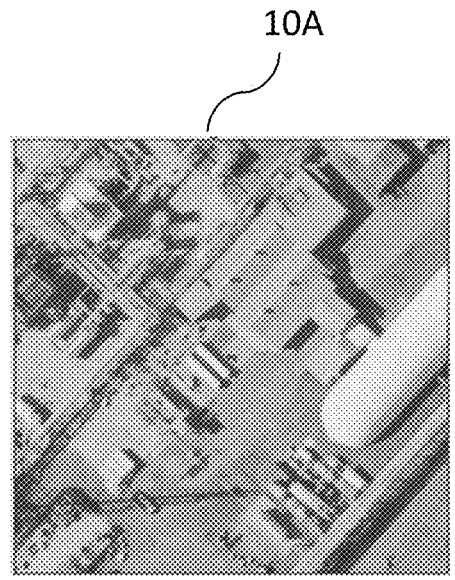
FIG. 10 is another schematic illustration of an an aerial image and a segmentation results obtained by a semantic segmentation model and a segment-aware sematic segmentation model.
Figure 10:
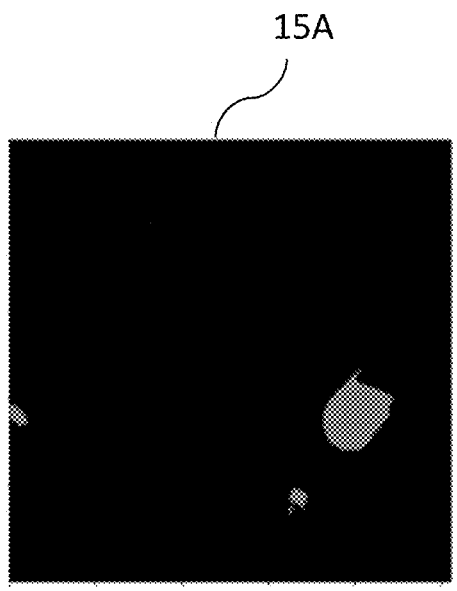
Figure 10:
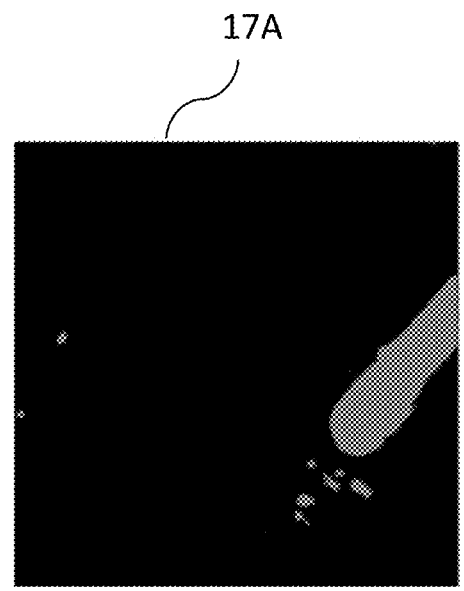

FIG. 10, to which reference is now made, includes an additional example of an aerial image 10A, a segmentation result 15A and a segment-aware segmentation result 17A. It may be appreciated that the in segment-aware segmentation result 17A more tanks (small, and horizontally-laying) were identified correctly compared to segmentation result 15A.

Segmentation result 17A was computed using the flow of FIG. 5A with a configuration of K=10 for segment-aware loss module 302 and weight of segments=4 (vs. weight of background pixels).

In one embodiment, segment-aware metric module 304 may provide a coverage metric that may be defined as the per-segment average, of the percentage of pixels in the segment that were correctly classified.

In one embodiment, segment-aware metric module 304 may consider a coverage-area that may regard all unclassified pixels located up to a certain distance from a correctly classified pixel in a segment as correctly classified and consider those pixels as true-positives.

In one embodiment segment-aware metric module 304 may consider all pixels withing a convex-hull (or any other containing shape) of correctly classified pixels in the segment as correctly classified and consider those pixels as true-positives.

In one embodiment segment-aware metric module 304 may compute a segment-aware IoU, where the IoU is computed separately for each segment and the segment-aware IoU metric is the average off all segments' IoU (instead of taking the sum of all overlapping pixels of all segments and dividing it by the sum of the pixels in the union of all segments).

Embodiments of the invention may provide systems and methods that can perform segment-aware semantic segmentation, i.e., consider pixel-segment association when computing any loss or metric value in addition to per-pixel features.

Embodiments of the invention may be used instead of instance segmentation when instances are mostly far enough from each other so that they do not get classified into the same segment, and may provide good segmentation quality in a relatively good performance. Instance segmentation is slower in training and inference compared to semantic segmentation and provides inferior prediction results (has a relatively higher error rate and may not always detect all objects in an image belonging to the same category), due to the need to solve the more challenging problem of instance separation, compared to embodiments of the segment-aware sematic segmentation of the invention.

It may be appreciated by the person skilled in the art that the steps shown in the different flows described herein are not intended to be limiting and that the flows may be practiced with more or less steps, or with a different sequence of steps, or any combination thereof.

It may also be appreciated by the person skilled in the art that the different parts of the system, shown in the different figures and described herein, are not intended to be limiting and that the system may be implemented by more or less parts, or with a different arrangement of parts, or with one or more processors performing the activities of the entire system, or any combination thereof.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general-purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description above. In addition, embodiments of the present invention are not described with reference to any particular programming language. It will be apparent to persons of ordinary skill in the art that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A computer-implemented method comprising:
receiving an image, a ground truth annotation mask and a segment ID mask, wherein the image comprises a plurality of pixels, the ground truth annotation mask comprises for each pixel a label of a correct class, and the segment ID mask comprises for each pixel a segment identifier identifying a segment to which the pixel belongs;
feeding the image to a machine learning model for semantic segmentation and computing an outcome;
computing a per-segment value for each one of the plurality of segments from the information in the outcome and in the ground truth annotation mask related to pixels associated with the one of the plurality of segments in the segment ID mask;
calculating a segment-aware value from a plurality of per-segment values;
using the segment-aware value for training the machine learning model for semantic segmentation; and
updating a plurality of parameters of the semantic segmentation machine learning model using the segment-aware value,
wherein the step of computing the per-segment value further comprises
computing, for each one of the plurality of pixels, a per-pixel loss value using the ground truth annotation mask and the outcome, wherein the outcome is a per class probability map containing for each pixel a probability of belonging to each class, and
computing a per-segment value for each one of the plurality of segments using a plurality of per-pixel loss values of pixels associated with the one of the plurality of segments, thereby creating a per-segment loss, and wherein the step of calculating a segment-aware value further comprises computing a segment aware-loss value as an aggregation of the per-segment loss values.

2. The method of claim 1 wherein the machine learning model for semantic segmentation is a deep convolution network.

3. The method of claim 1 wherein
the step of computing a per-segment loss value further comprises, for each segment, selecting K pixels from a plurality of pixels associated with the segment having a smallest per-pixel loss value, and selecting a highest value from the K selected pixels as the per-segment loss value, and
the step of calculating a segment-aware loss value further comprises aggregating the per-segment loss values of all segments, thereby reflecting the ability of the model to correctly classify at least K pixels of each segment.

4. The method of claim 1 wherein the step of computing a per-segment value further comprises multiplying each per-segment value by a known per-segment weight thereby providing a weighted per-segment value signifying a different importance to different segments.

5. A computer-implemented system comprising:
at least one memory;
at least one processor communicatively coupled to the memory; and
a segment-aware semantic segmentation unit, operated by the at least one processor, configured to:
receive an image, a ground truth annotation mask and a segment ID mask, wherein the image comprises a plurality of pixels, the ground truth annotation mask comprises for each pixel a label of a correct class and the segment ID mask comprises, for each pixel, a segment identifier identifying a segment to which the pixel belongs,
compute a segment-aware value using the image, the ground truth annotation mask and the segment ID mask, and
use the segment-aware value to perform any of: train a machine learning model for semantic segmentation, validate the machine learning model for semantic segmentation and test the machine learning model for semantic segmentation,
wherein the segment-aware semantic segmentation unit further comprises
a segment-aware function unit configured to compute a segment-aware value,
a machine learning model for semantic segmentation,
a training unit configured to train the machine learning model for semantic segmentation using the segment-aware value,
a validation unit configured to provide a metric indicative of the quality of the machine learning model for semantic segmentation using the segment-aware value, and
an inference unit configured to use the machine learning model for semantic segmentation and provide a segment-aware segmentation result containing for each pixel a predicted class, and
wherein the segment-aware function unit further comprises a segment-aware loss module configured to use the segment ID map to compute a segment-aware loss value indicative of an ability of the machine learning model for semantic segmentation to correctly classify all segments in the image and a segment-aware metric module configured to use the segment ID map to compute a segment-aware metric value indicative of a quality of the machine learning model for semantic segmentation, and
wherein the segment-aware loss module is configured to
compute for each one of the plurality of pixels a per-pixel loss value between the ground truth annotation mask, and a per class probability map containing for each pixel a probability of belonging to each class, and
compute a per-segment loss value for each one of the plurality of segments in the segment ID map using a plurality of per-pixel loss values of pixels associated with the one of the plurality of segments.

6. The system of claim 5 wherein the machine learning model for semantic segmentation is a deep convolution network.

7. The system of claim 5 wherein the segment-aware loss module is further configured to:
select from a plurality of pixels associated with the segment in the segment ID mask K pixels having smallest per-pixel loss values;
select a highest per-pixel loss value from the K selected pixels as the per-segment loss value; and
aggregate the per-segment loss values of all segments to create a segment-aware loss value that reflects the ability of the model to correctly classify at least K pixels of each segment in the image.

8. The system of claim 5 wherein the segment-aware loss module is further configured to multiply each per-segment value by a known per-segment weight thereby providing a weighted per-segment value to each segment.

9. The system of claim 5 wherein the segment-aware metric module is further configured to:
compute for each one of the plurality of pixels a per-pixel metric value using the ground truth annotation mask and the segmentation result; and
compute a per-segment metric value for each one of the plurality of segments in the segment ID mask using a plurality of per-pixel metric values of pixels associated with the one of the plurality of segments.

10. The system of claim 9 wherein the segment-aware metric module is further configured to:
count for each segment a number of correctly classified pixels wherein a correctly classified pixel is a pixel having a label of a predicted class in the segmentation result identical to the label in the ground truth annotation mask, and
compute the segment-aware metric as a ratio between a number of segments for which at least a predetermined number of pixels were classified correctly, and a total number of segments present in the ground truth annotation mask.

11. The system of claim 9 wherein the segment-aware metric module is further configured to replace the segment ID mask with a containing segment ID mask, wherein each segment in the containing segment ID mask consists of a plurality of original pixels from a corresponding segment in the segment ID mask and at least one additional pixel located within a specified distance from one of the original pixels of the segment.

12. The system of claim 9 wherein the segment-aware metric module is further configured to compute a per-segment intersection over union (IoU) metric for each segment in the segment ID mask based on a plurality of pixels associated with the segment in the ground truth annotation mask and a plurality of pixels associated with the segment in the containing ID mask and computing the segment-aware value provides a segment-aware IoU metric computed as an average of the per-segment IoU metrics of the plurality of segments.

13. A computer-implemented method comprising:
receiving an image, a ground truth annotation mask and a segment ID mask, wherein the image comprises a plurality of pixels, the ground truth annotation mask comprises for each pixel a label of a correct class, and the segment ID mask comprises for each pixel a segment identifier identifying a segment to which the pixel belongs;

feeding the image to a machine learning model for semantic segmentation and computing an outcome;

computing a per-segment value for each one of the plurality of segments from the information in the outcome and in the ground truth annotation mask related to pixels associated with the one of the plurality of segments in the segment ID mask;

calculating a segment-aware value from a plurality of per-segment values; and using the segment-aware value for validating the machine learning model for semantic segmentation and testing the machine learning model for semantic segmentation, wherein the step of computing a per-segment value further comprises computing for each one of the plurality of pixels a per-pixel metric value using the ground truth annotation mask and the outcome, wherein the outcome is a segmentation result containing for each pixel a label of a predicted class, and computing a per-segment value for each one of the plurality of segments in the segment ID mask using a plurality of per-pixel metric values of pixels associated with the one of the plurality of segments thereby creating a per-segment metric, wherein computing a per-segment metric further comprises counting for each segment a number of correctly classified pixels, wherein a correctly classified pixel is a pixel having a label of a predicted class in the segmentation result identical to the label in the ground truth annotation mask, and wherein the computing a segment-aware metric further comprises computing a ratio between the number of segments for which at least a predetermined number of pixels were classified correctly, and a total number of segments present in the ground truth annotation mask.

14. The method of claim 13 further comprising:

creating a containing segment ID mask from the segment ID mask; and replacing the segment ID mask with the containing segment ID mask in the step of computing a per-segment value, wherein the creating a containing segment ID mask comprises, for each one segment, assigning an identifier of the one segment in the segment ID mask to a plurality of original pixels within a corresponding segment in the containing segment ID mask, and assigning the identifier to at least one additional pixel located within a certain distance from one of the original pixels of the segment in the containing segment ID mask thereby associating the at least one of the additional pixels with the segment in the containing segment ID mask.

15. The method of claim 14 wherein wherein the step of computing a per-segment metric further comprises, for each one segment, computing a per-segment intersection over union (IoU) between a plurality of pixels associated with the one segment in the ground truth annotation mask and a plurality of pixels associated with the one segment in the containing segment ID mask, and wherein the step of calculating a segment-aware IoU comprises computing an average between the plurality of per-segment IoU.

* * * * *